Dec. 29, 1959   G. T. McCLURE ET AL   2,919,163
LOAD-CONTROLLED BRAKE APPARATUS FOR RAILWAY CARS
Filed Sept. 28, 1955
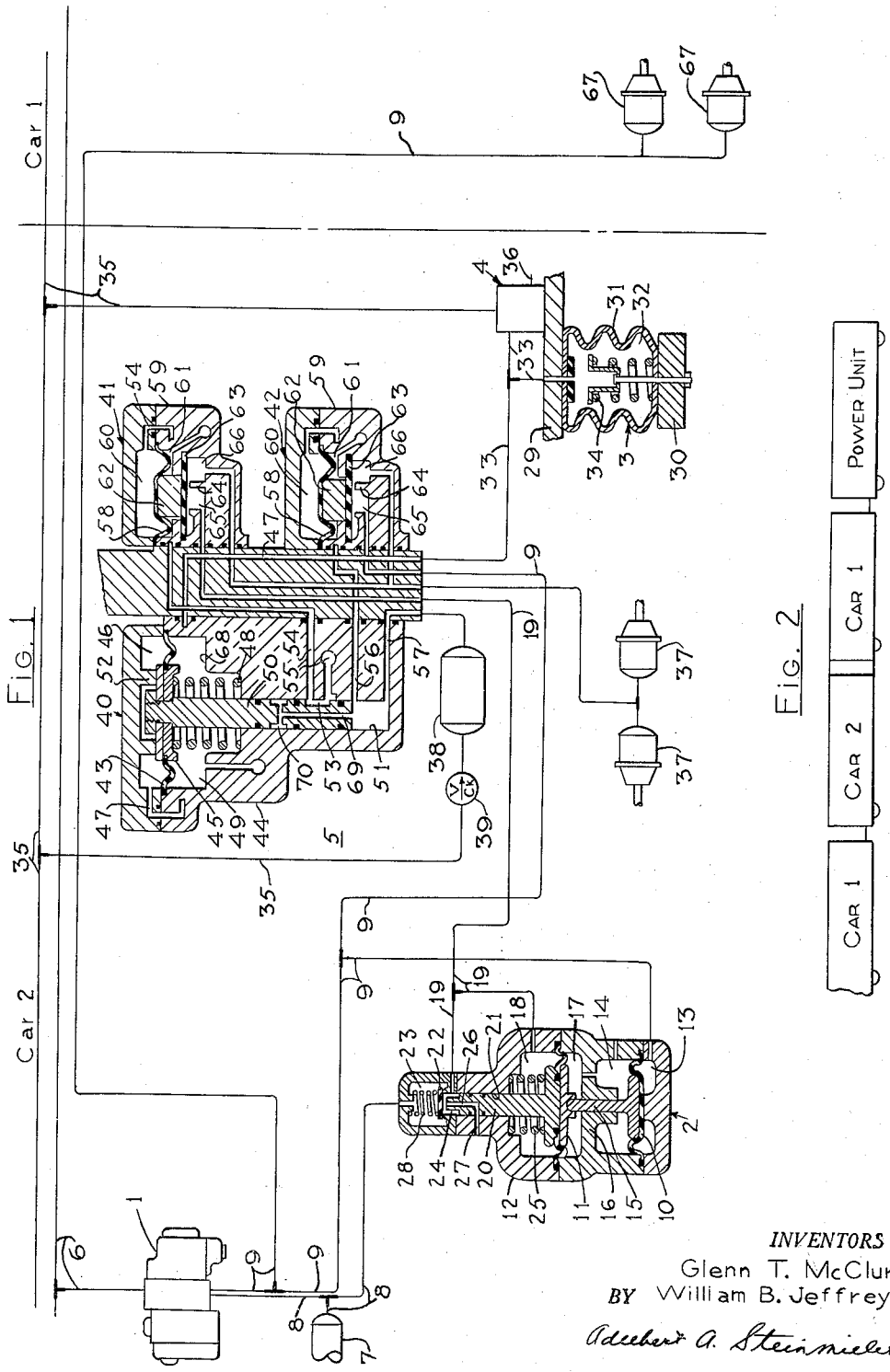
INVENTORS
Glenn T. McClure
BY William B. Jeffrey
Adelbert A. Steinmeier
ATTORNEY

# United States Patent Office 2,919,163
Patented Dec. 29, 1959

2,919,163

LOAD-CONTROLLED BRAKE APPARATUS FOR RAILWAY CARS

Glenn T. McClure, McKeesport, and William B. Jeffrey, Irwin, Pa., assignors to Westinghouse Air Brake Company, Wilmerding, Pa., a corporation of Pennsylvania Application September 28, 1955, Serial No. 537,166

7 Claims. (Cl. 303—22)

This invention relates to load-controlled brake apparatus for railway cars of the type in which the car body is supported upon an unsprung member by fluid pressure receiving means, such as air springs or the like, and more particularly relates to an improved apparatus of the above general type embodying novel means for selecting between a full braking ratio or a partial braking ratio according to whether a car is heavily or lightly loaded.

One object of the invention is to provide a relatively low cost load-controlled brake apparatus adapted to select between a plurality of braking ratios according to load condition of any railway car having a car body supported on an unsprung member by fluid pressure means, the pressure in which varies in proportion to car load.

Another object is to provide an improved load-controlled brake apparatus embodying an arrangement wherein the variable pressure of fluid supplied to an air spring means or the like for maintaining the car body at a preselected constant height relative to an unsprung portion of the car despite variation in the degree of load on the car is additionally employed as a control pipe for controlling operation of means that selects braking ratio according to load condition of the car.

Another object is to provide a load-controlled brake apparatus especially adapted for use on the rear car of an articulated multi-car unit to provide a full braking ratio on said rear car if an additional articulated multi-car unit is removably coupled thereto and a lesser braking ratio if no such additional unit is so coupled. These articulated multi-car units may be of the type, such as proposed for use in the recently publicized "Train X," comprising a plurality of permanently connected light, low center of gravity, high-speed cars each having but one wheel-supporting axle, which is at the rear thereof; it being noted that if another articulated unit is coupled to the rear car of a forward articulated unit, the load on the axle of said rear car will be considerably greater than if no such other articulated unit is so coupled.

Other objects and advantages will become apparent from the following more detailed description of the invention and from the accompanying drawing, wherein Fig. 1 is a diagrammatic view of a load-controlled brake apparatus embodying the invention; and Fig. 2 is a schematic view of a portion of a train comprising an articulated multi-car unit of the type on which the invention may, for sake of illustration, be employed.

*Description*

As shown in Fig. 1 of the accompanying drawing, the load-controlled brake apparatus embodying the invention comprises a brake controlling valve device 1, a pneumatically controlled relay valve device 2, an air spring device 3, a control or leveling valve device 4 for controlling air pressure in said air spring device according to load condition of the car, and an automatically operated load-controlled valve device 5 for selecting between a plurality of braking ratios according to pressure of fluid in said air spring device.

The brake controlling valve device 1 may be of any well-known type, such as the "AB" valve, comprising valve means (not shown) responsive to a chosen reduction in pressure of fluid in a brake pipe 6 below a normal full charge value to supply fluid under pressure from an auxiliary reservoir 7 via a pipe 8 to a pipe 9 for causing an application of brakes and responsive to a subsequent increase in brake pipe pressure to release fluid under pressure from pipe 9 for causing a release of brakes.

The relay valve device 2 may, for sake of illustration, comprise two coaxially arranged, cooperatively connected movable abutments 10, 11 of different effective areas suitably mounted in a sectionalized casing 12, so as to constitute a stack. As viewed in the drawing, the smaller movable abutment 10 is subject at its under side to pressure of fluid in a chamber 13 open to a branch of pipe 9, and is subject at the opposite side to atmospheric pressure in a chamber 14. The movable abutment 10 carries a coaxially arranged pusher stem 15 which projects from chamber 14 through a casing partition 16 into an atmospheric chamber 17 at the under side of movable abutment 11; and at the opposite side of the latter is a chamber 18 that is open to a pipe 19 leading to the valve device 5. Coaxially connected to the upper side of larger movable abutment 11 is a cylindrical slide valve 20 which has sealing, slidably guided contact with the wall of an aligned bore 21 open at one end to chamber 18. A check valve 22, arranged coaxially with and above the slide valve 20, controls communication between a chamber 23 constantly open to the auxiliary reservoir pipe 8 and a chamber 24 constantly open to a branch of pipe 19.

When the chambers 13 and 18 are devoid of fluid under pressure, a helical bias spring 25, disposed in chamber 18 and acting on the movable abutment 11, urges the valve 20 to a normal or release position, in which it is shown, and in which a suitable passageway 26 in said valve connects chamber 24 to a vent port 27, and the projecting end of said valve is disengaged from the check valve 22 for enabling the latter to be seated by a bias spring 28 in chamber 23.

A plurality of air spring devices 3 (only one of which is shown) are interposed between a sprung member such as a body 29 of a railway car (or a member rigidly connected to said body) and an unsprung member, such as a non-rotatable wheel-supporting axle 30 (or a member rigidly connected to said axle) for maintaining the car body 29 in a preselected vertical position relative to the unsprung member, in the manner to be described. The axle 30 is preferably of the drop-center type and two air spring devices 3 are preferably mounted at the outer extremities of the drop-center portion of said axle to provide lateral stability of the car body.

Each air spring device 3 may comprise a hollow casing 31 consisting of two flat, spaced, coaxially arranged and preferably circular end walls joined to each other by a corrugated or bellows-like axially expandable portion. Each device 3 is so arranged that the end walls of casing 31 are in vertically spaced relation, with the lower end wall engaging a flat horizontal surface on the drop-center portion of the axle 30 or on another unsprung member, while the upper end wall engages a flat horizontal surface on the car body 29 or other sprung member. Contained in casing 31 is an air chamber 32 which is chargeable with fluid under pressure from the valve device 4 via a pipe 33. A helical spring 34 suitably retained to limit its extension in the direction of the upper end wall of casing 31 is preferably provided in chamber 32 for supporting the car body 29 at a chosen minimum height (less than the aforementioned preselected height)

relative to the axle 30 in event of a failure of air supply to chamber 32.

The control or leveling valve device 4 may, for sake of illustration, be of the type disclosed in the copending application of Harry C. May and Joseph F. Frola, U.S. Serial No. 568,113, filed February 27, 1956 and assigned to the assignee of the present invention. This control valve device is mounted on the car body 29 or other sprung portion and comprises, briefly, valve means (not shown) operable by suitable linkage (not shown) suitably connected to an unsprung member, such as axle 30, for supplying fluid under pressure to chamber 32 from a supply pipe 35 and releasing fluid under pressure from said chamber via a vent pipe 36, as may be required to maintain the car body 29 at the aforementioned preselected height relative to said axle; said supply pipe 35 being charged from a suitable source on a power unit and extending from the latter through the connected cars. It therefore follows that the pressure of fluid thus established in chamber 32 is an accurate measure of the load imposed on the axle 30. Only one such valve device 4 need be used to control air pressure in the respective chambers 32 of the air spring devices 3 employed on a particular axle.

The load-controlled valve device 5 may comprise a suitable pipe bracket to which are connected a branch of pipe 33; the pipes 9 and 19; a pipe leading to brake cylinders 37 for each wheel (not shown) supported by the axle 30; and a pipe leading to a storage volume 38, which is chargeable with fluid under pressure from the supply pipe 35 via a non-return check valve 39.

The valve device 5 also comprises a selector valve device 40 and two remotely controlled cut-off valve devices 41, 42, each of which valve devices 40, 41, 42 is suitably mounted on the pipe bracket, which may in turn be suitably mounted on the car body.

The selector valve device 40 may comprise an annular flexible diaphragm 43 suitably clamped about its outer edge between sections of a casing 44 and about its inner edge between parts of a diaphragm follower assemblage 45. The diaphragm 43 is subject at one side to pressure of fluid in a chamber 46 constantly open to a branch of pipe 33 via a passage 47, and is subject at the opposite side to pressure of a helical spring 48 in an atmospheric chamber 49. Suitably secured to the follower assemblage 45 is a coaxially arranged cylindrical slide valve 50 having sealing, slidably guided contact with the wall of an aligned bore 51 provided in the casing 44 and open to chamber 49.

When pressure of fluid in chamber 46 is less than a predetermined value, the pressure of spring 48 will maintain the selector valve 50 in a "light-load" position, in which it is shown, defined by contact of assemblage 45 with a stop rim 52 formed on the end wall of chamber 46. With valve 50 in this position, an elongated annular cavity 53 therein connects a passage 54 to an atmospheric vent port 55; and a passage 56 leading to valve bore 51 is uncovered by the inner end of said valve 50 to a passage 57 that is connected by the aforementioned pipe to volume 38.

Each of the cut-off valve devices 41, 42 may comprise a flexible diaphragm 58 suitably clamped about its outer edge between sections of a casing 59 and subject at one side to pressure of fluid in a chamber 60 and at the opposite side to atmospheric pressure in a chamber 61. A diaphragm follower 62 engaging the atmospheric side of diaphragm 58 operatively connects the latter to a coaxially arranged preferably circular diaphragm-like resilient element 63 suitably clamped about its outer edge between sections of the casing 59. When chamber 60 is charged with fluid under pressure, the diaphragm 58 will deflect and hold the element 63 in sealing contact with a coaxially arranged annular valve seat rib 64 for preventing flow of air from a chamber 65 encircled by said rib to a chamber 66 encircling said rib.

In valve device 41, chamber 60 is open to passage 54, chamber 65 is open to the pipe 19, and chamber 66 is open to the brake cylinders 37. In valve device 42, chamber 60 is open to passage 56, chamber 65 is open to pipe 9, and chamber 66 is open to the brake cylinders 37.

The load-controlled brake apparatus as thus far described may be employed on any railway car of the type wherein the sprung portion is supported in vertically spaced relation to the unsprung portion by fluid pressure receiving means when control of braking ratio according to load condition of said car is desired. This apparatus may be also used to vary braking ratio on the rear car of an articulated multi-car unit, which unit may be of the two-car type, shown in Fig. 2 of the drawing, and comprising a "Car 1" and a "Car 2" which are permanently secured to each other; each of said cars having a single wheel-supporting axle, such as 30, which is at the rear thereof. To the front car (i.e., "Car 1") of this articulated car unit may be detachably coupled a "Power Unit"; and to the rear car (i.e., "Car 2") of said car unit may be detachably coupled the first car of another articulated car unit, to the rear of which may be successively coupled still other articulated car units, etc. With a car unit of this or generally similar type, when two articulated car units are coupled together, the axle of "Car 2" must bear a portion of the weight of "Car 1" of the adjacent rearward car unit, and hence a full or normal braking ratio is desired on "Car 2"; but where no such rearward car unit is coupled to a particular "Car 2," or where a two-axle car is coupled to such "Car 2," the axle load on the latter will be reduced and it is therefore desirable to correspondingly reduce the braking ratio on said "Car 2" in order to prevent excessive braking and possible sliding of the car wheels. Hence, "Car 2" is provided with the load-controlled brake apparatus thus far described. On the other hand, since the axle of "Car 1" of any articulated car unit will always support a part of the weight of the "Car 2" of said car unit, full braking ratio will always be desired on "Car 1"; and for this reason, a branch of pipe 9 leads directly to brake cylinders 67 for the wheel-axle unit on "Car 1."

In operation, assume that the improved brake apparatus is installed on "Car 2" of an articulated car unit of the type just described; that no similar car unit is coupled to the rear of said "Car 2"; that control valve device 4 has operated to provide air at a relatively low pressure in the respective chambers 32 of air spring devices 3, as well as in chamber 46 of selector valve device 40, which low pressure is sufficient to maintain the car body 29 in the aforementioned preselected vertical position relative to the axle 30, in view of the reduced load carried by the axle of said "Car 2," and which low pressure is such that the selector valve 50 of valve device 40 will assume its "light-load" position; and that the brake pipe 6 is fully charged.

Under these conditions, the brake controlling valve device 1 will maintain pipe 9 and hence the brake cylinders 67 in "Car 1" vented; and with pipe 9 and hence chamber 13 of relay valve device 2 on "Car 2" vented, the relay valve 20 will be in its release position, in which pipe 19 is vented via chamber 24, valve passageway 26 and vent port 27. Hence the brake cylinders 37 on "Car 2" will be vented by way of the chamber 66 and unseated sealing element 63 and chamber 65 of valve device 41, and the vented pipe 19 because chamber 60 of the latter device will be vented via passage 54, valve cavity 53 of selector valve 50 in its "light-load" position, and vent port 55. And with valve 50 in this position, fluid under pressure supplied from volume 38 via passages 57, 56 to chamber 60 of valve device 42 will cause the diaphragm 58 of said device to maintain the corresponding sealing element 63 seated against its seat rib 64 for closing off pipe 9 from the brake cylinders 37. Hence, the various components, except valve device 42, will be in the respective positions in which they are shown in the drawing.

Assuming now that brake pipe pressure is reduced a chosen degree, the brake controlling valve device 1 will operate to supply fluid at a corresponding pressure to the pipe 9. Some of the fluid under pressure thus supplied to pipe 9 will flow directly to the brake cylinders 67 on "Car 1," and some of such fluid will also flow to chamber 13 of relay valve device 2 on "Car 2" and shift the movable abutment stack against resistance of the light bias spring 25 for moving valve 20 to a supply position. During such movement, the valve 20 will cut off chamber 24 from vent port 27 and will engage and then unseat the check valve 22 against resistance of bias spring 28, thereby opening said chamber 24 to chamber 23; whereupon fluid under pressure will flow from the auxiliary reservoir 7 past unseated check valve 22 to pipe 19.

Some of the fluid thus supplied to pipe 19 will flow to chamber 18 above the larger movable abutment 11, and when pressure in said chamber increases to a value which is a chosen proportion of the pressure supplied from valve device 1 to the chamber 13 (according to the selected ratio of the effective areas of the movable abutments), the stack will shift in the direction of chamber 13 for moving the valve 20 to a lap position, in which check valve 22 is seated for cutting off further supply to pipe 19 while said valve 20 maintains said pipe cut off from vent port 27, for thereby bottling up fluid in said pipe 19 at the desired proportionate pressure of that then existing in pipe 9.

Meanwhile, some of the fluid supplied to pipe 19 will flow to chamber 65 of valve device 41, and unseat and flow past the sealing element 63 and via chamber 66 to the brake cylinders 37 for applying brakes at a reduced braking ratio corresponding to the ratio of pressures in pipes 19 and 9 and to a degree corresponding to the pressure in pipe 19; it being noted that chamber 60 of valve device 41 is vented via cavity 53 of valve 50 in "light-load" position, as already explained.

Hence when the load on the axle of any railway car (such as "Car 2" in the illustrative showing) is less than a preselected amount and air spring pressure as noted in chamber 46 of selector valve device 40 is therefore below a predetermined value, brakes on said car will be applied according to a chosen partial or reduced braking ratio. When the improved brake apparatus is employed on an articulated multi-car unit, the brakes on the rear car (e.g., "Car 2") will be controlled according to this chosen partial or reduced braking ratio whenever said rear car is the last car in the train or whenever said rear car is detachably coupled to a two-axle car, in which latter case the axles of the two-axle car will completely support its own weight and hence impose no load on the axle of said rear car of the single-axle type. And brakes on the forward cars (e.g., "Car 1") of the articulated multi-car unit will be controlled according to full braking ratio.

When brake pipe pressure is increased for releasing brakes, the brake controlling valve device 1 will operate to release fluid under pressure from pipe 9 and hence from the brake cylinders 67 on "Car 1" and from chamber 13 of relay valve device 2 on "Car 2." Upon release of fluid under pressure from chamber 13, the stack of device 2 will shift and thereby move the valve 20 to its previously defined release position for venting pipe 19 and hence venting the brake cylinders 37 via valve device 41 by reverse flow through communication just described.

The volume 38 and check valve 39 are preferably provided for assuring that in event of pull-apart and consequent venting of supply pipe 35, a fluid pressure source (volume 38) will be available on the car for maintaining chamber 60 of valve device 42 charged, if the car is lightly loaded and selector valve 50 is consequently in its "light-load" position, so that the desired reduced braking ratio on said car will be maintained during the emergency brake application resultant from such pull-apart. If desired, however, the volume 38 and check valve 39 may be eliminated and passage 57 connected directly to a branch of supply pipe 35.

Assuming now that the axle of "Car 2" is more heavily loaded, such as by virtue of an additional articulated car unit of the subject type being detachably coupled thereto, the leveling valve device 4 will operate to increase the pressure of air in the pipe 33 and air spring chamber 32 sufficiently to maintain the car body 29 at the aforementioned preselected height relative to the axle 30. This increased pressure, as noted via pipe 33 in chamber 46 of selector valve device 40, will be of sufficient magnitude to cause the diaphragm 43 of said device to deflect against resistance of spring 48 and thereby operatively shift the selector valve 50 to a "heavy-load" position, defined by contact of the follower assemblage 45 with a stop surface 68 provided in the end wall of chamber 49. In this position of valve 50, valve cavity 53 connects passage 56 to vent port 55 for venting chamber 60 of valve device 42 and thereby opening pipe 9 to the brake cylinders 37 past the unseated corresponding sealing element 63; and an axial passageway 69 opening through the inner end of valve 50 and an elongated annular valve cavity 70 constantly open thereto to establish a connection between passages 57 and 54 for causing fluid under pressure to flow from volume 38 to chamber 60 of valve device 41 for causing the corresponding sealing element 63 to be held in sealing contact with its seat rib 64 and thereby close off pipe 19 from the brake cylinders 37.

Hence under the assumed condition, when the brake controlling valve device 1 responds to a reduction in brake pipe pressure and supplies fluid at a corresponding pressure to the pipe 9, such fluid will flow to the brake cylinders 67 on "Car 1" and also flow past the unseated sealing element 63 of valve device 42 to the brake cylinders 37 on "Car 2"; it being noted that the relay valve device 2 will operate to control pressure in the pipe 19 in the manner previously described, but that this will be of no consequence since pipe 19 is cut off from the brake cylinders 37 by valve device 41. When brake pipe pressure is increased for releasing brakes, the brake pressure is increased for releasing brakes, the brake controlling valve device 1 will operate to release fluid under pressure from pipe 9 and hence from the brake cylinders 37 and 67 by reverse flow through the communications just described.

It is preferable that the cut-off valve devices 41, 42 be provided to handle the requisite flow capacity to the brake cylinders 37, with the selector valve 50 merely handling a pilot pressure supplied from volume 38 for controlling selective closure of these devices 41, 42. If desired, however, the selector valve 50 may control selective connection of the pipes 9 or 19 with the brake cylinders 37 according to whether pressure in chamber 46 is greater or less than the aforementioned predetermined value.

*Summary*

It will now be seen that the improved brake apparatus comprises a relay valve device 2 for providing in a pipe 19 fluid at a chosen proportion of the pressure in pipe 9 as controlled by operation of the brake controlling valve device 1 responsively to variations in brake pipe pressure; a leveling or control valve device 4 for so regulating pressure in an air spring device 3 as to maintain the car body 29 at a preselected height above the rails, and which air spring pressure thus constitutes an accurate measurement of the load condition on the car; and a selector valve device 40 for causing selective connection of pipes 19 or 9 to the brake cylinders 37 on the particular car according to whether pressure in said air spring device is less than or greater than a predetermined value, for thereby causing brakes on said car to be controlled according to a lesser braking ratio or a normal braking ratio, respectively.

It will also be seen that the brake apparatus embodying the invention may be used to control brakes on any railway car employing fluid pressure receiving means, such as air springs or the like, to maintain the car body at a constant preselected height above the rails; and that such apparatus is especially adapted for controlling brakes on the rear car of an articulated multi-car unit, such as of the "Train X" type, comprising a plurality of permanently connected cars each having but a single axle located at the rear thereof.

Having now described the invention, what we claim as new and desire to secure by Letters Patent is:

1. A load controlled brake apparatus for a railway car comprising, in combination, fluid pressure receiving means supporting a sprung portion of the car in vertically spaced relation relative to an unsprung portion thereof, means for providing in the fluid pressure receiving means a fluid pressure proportionate to the load condition of the car, a source of fluid under pressure other than said fluid pressure receiving means, a first conduit to which fluid under pressure is supplied from said source for causing an application of brakes and from which fluid under pressure is released for causing a release of brakes, a second conduit, relay means for providing in said second conduit from said source fluid at a chosen proportion of the pressure of fluid in said first conduit, a brake cylinder, and means responsive to a fluid pressure of more than a predetermined value in said fluid pressure receiving means to cause said brake cylinder to be connected to said first conduit and responsive to a fluid pressure of less than said predetermined value in said fluid pressure means to cause said brake cylinder to be connected to said second conduit, for thereby causing braking ratio to be selected according to pressure in said fluid pressure receiving means.

2. In a load-controlled brake apparatus for a railway car, the combination of fluid pressure controlled means for controlling vertical positioning of a sprung portion of the car relative to an unsprung portion thereof, valve means operative to provide a control fluid pressure, the magnitude of which is directly proportionate to the load condition of the car for so controlling operation of said fluid pressure controlled means as to cause the latter to maintain the sprung portion in a substantially fixed preselected vertical position relative to the unsprung portion under all conditions of car load, a first conduit to which fluid under pressure is supplied for causing an application of brakes and from which fluid under pressure is released for causing a release of brakes, a second conduit, relay means always responsive to pressurization of said first conduit to provide in said second conduit fluid at a chosen proportion of the pressure in said first conduit, a brake cylinder, and means operative to cause fluid pressure in said brake cylinder to be established according to pressure in said first conduit or second conduit according to whether the said control pressure provided by said valve means is greater than or less than a predetermined value for thereby varying braking ratio on the car accordingly.

3. A load-controlled brake apparatus for a railway car comprising, in combination, air spring means interposed between a sprung portion and an unsprung portion of the car for controlling height of the sprung portion relative to the unsprung portion, valve means for so regulating the pressure of air in said air spring means as to cause the latter to maintain the sprung portion at a substantially constant preselected height relative to the unsprung portion under all conditions of car load, a brake pipe normally charged with fluid under pressure, an auxiliary reservoir, a first conduit, brake controlling valve means responsive to a chosen reduction in brake pipe pressure below normal full charge value to supply fluid under pressure from said auxiliary reservoir to said first conduit for causing the latter to be charged with fluid at a pressure corresponding to said chosen reduction and responsive to a subsequent increase in brake pipe pressure to cause release of fluid under presure from said first conduit, a brake cylinder, a second conduit, relay means for supplying fluid under pressure from said auxiliary reservoir to said second conduit for providing in the latter fluid at a selected proportion of the pressure in said first conduit, and means for causing said first conduit or second conduit to be alternatively connected with said brake cylinder according to whether pressure of air in said air spring means is greater than or less than a predetermined value for thereby providing a greater or lesser braking ratio on said car, respectively.

4. A load-controlled brake apparatus for a railway car comprising, in combination, air spring means interposed between a sprung portion and an unsprung portion of the car for controlling height of the sprung portion relative to the unsprung portion, valve means for so regulating the pressure of air in said air spring means as to cause the latter to maintain the sprung portion at a substantially constant preselected height relative to the unsprung portion under all conditions of car load, a brake pipe normally charged with fluid under pressure, a first conduit, brake controlling valve means responsive to a chosen reduction in brake pipe pressure below normal full charge value to cause said first conduit to be charged with fluid at a pressure corresponding to said chosen reduction and responsive to a subsequent increase in brake pipe pressure to cause release of fluid under pressure from said first conduit, a brake cylinder, a second conduit, relay means for always providing in said second conduit fluid at a chosen proportion of the pressure in said first conduit, pneumatically operated means variously conditionable for controlling connection of said brake cylinder alternatively with said first conduit and second conduit, selector means having several positions for controlling conditioning of said pneumatically operated means, and motor means controlled by pressure of air in said air spring means to control positioning of said selector means.

5. In a load-controlled brake apparatus for a railway car, the combination of fluid pressure controlled means for controlling vertical positioning of a sprung portion of the car relative to an unsprung portion thereof, valve means operative to provide a control fluid pressure the magnitude of which is directly proportionate to the load condition of the car for so controlling operation of said fluid pressure controlled means as to cause the latter to maintain the sprung portion in a substantially fixed preselected vertical position relative to the unsprung portion under all conditions of car load, a first conduit to which fluid under pressure is supplied for causing an application of brakes and from which fluid under pressure is released for causing a release of brakes, a second conduit, relay means responsive to pressurization of said first conduit to provide in said second conduit fluid at a chosen fractional proportion of the pressure in said first conduit, a brake cylinder, first cut-off valve means having a first chamber and operative to connect to disconnect said brake cylinder with said first conduit according to whether said first chamber is vented or charged with fluid under pressure, second cut-off valve means having a second chamber and operative to connect or disconnect said brake cylinder with said second conduit according to whether said second chamber is vented or is charged with fluid under pressure, and selector means for charging said first chamber and venting said second chamber at one time and for venting said first chamber and charging said second chamber at another time, according to whether said control fluid pressure is less than or greater than a predetermined value.

6. The combination according to claim 5, including a fluid pressure supply pipe extending through the car and chargeable from a source not on the car, a volume on the car for storing fluid under pressure, one-way flow means for permitting flow only from said supply pipe to said volume, said volume constituting the source from which said selector means charges said first and second chambers.

7. A fluid pressure brake apparatus for an articulated multi-car unit of the type comprising a plurality of permanently connected cars each having but a substantially single axle which is at the rear thereof, said apparatus comprising, in combination, air spring means for each car of the unit for resiliently supporting a sprung portion of such car in vertically spaced relation to the axle of such car, valve means for so regulating pressure of fluid in said air spring means as to cause the latter to maintain the sprung portion of such car at a constant preselected height relative to said axle under all conditions of car load, a first conduit to which fluid under pressure is supplied for causing an application of brakes and from which fluid under pressure is released for causing a release of brakes, a second conduit, relay means for always providing in said second conduit fluid at a chosen fractional proportion of the fluid pressure in said first conduit, brake cylinders for each car of the unit, first cut-off valve means having a first chamber and operative to connect or disconnect said first conduit with the brake cylinders on the rear car of said unit according to whether said first chamber is vented or is charged with fluid under pressure, second cut-off valve means having a second chamber and operative to connect or disconnect said second chamber with the brake cylinders on said rear car of the unit according to whether said second chamber is vented or is charged with fluid under pressure, and selector valve means responsive to a relatively high value of air spring pressure corresponding to that obtained when the axle of said rear car supports a part of the weight of the forward car of an adjacent similar articulated car unit to supply fluid under pressure to said second chamber and vent said first chamber and responsive to a relatively low value of air spring pressure corresponding to that obtained when the axle of said rear car supports only the weight of said rear car to supply fluid under pressure to said first chamber and vent said second chamber, pressure of fluid in the brake cylinders on all cars of said unit except said rear car thereof always being controlled according to the pressure of fluid in said first conduit.

References Cited in the file of this patent
UNITED STATES PATENTS

| 843,481 | McCook | Feb. 5, 1907 |
| 976,000 | Schenk | Nov. 15, 1910 |
| 1,694,951 | Reynolds | Dec. 11, 1928 |
| 1,895,483 | Neveu | Jan. 31, 1933 |
| 1,922,227 | Brecht | Aug. 15, 1933 |
| 1,936,966 | Kasantzeff | Nov. 28, 1933 |
| 2,068,342 | McClure | Jan. 19, 1937 |
| 2,150,576 | Bell | Mar. 14, 1939 |
| 2,173,928 | Borde et al. | Sept. 26, 1939 |
| 2,361,575 | Thompson | Oct. 31, 1944 |
| 2,691,420 | Fox et al. | Oct. 12, 1954 |
| 2,720,429 | Newell | Oct. 11, 1955 |
| 2,729,515 | Ross et al. | Jan. 3, 1956 |

OTHER REFERENCES

Publication: Instruction Pamphlet #34. New York Air Brake Co., February 1935.